(12) United States Patent
Peterson

(10) Patent No.: US 12,011,653 B2
(45) Date of Patent: Jun. 18, 2024

(54) SYSTEM FOR PROVIDING PUTTING SPEED AND DIRECTION

(71) Applicant: Ovation Golf, LLC, Elk Ridge, UT (US)

(72) Inventor: Jack W. Peterson, Elk Ridge, UT (US)

(*) Notice: Subject to any disclaimer, the term of this patent is extended or adjusted under 35 U.S.C. 154(b) by 0 days.

(21) Appl. No.: 18/224,483

(22) Filed: Jul. 20, 2023

(65) Prior Publication Data

US 2024/0033603 A1    Feb. 1, 2024

Related U.S. Application Data

(60) Provisional application No. 63/393,193, filed on Jul. 28, 2022.

(51) Int. Cl.
*A63B 71/06* (2006.01)
*A63B 69/36* (2006.01)

(52) U.S. Cl.
CPC .......... *A63B 71/0622* (2013.01); *A63B 69/36* (2013.01); *A63B 2220/16* (2013.01)

(58) Field of Classification Search
CPC ............... A63B 71/0622; A63B 69/36; A63B 2220/16
See application file for complete search history.

(56) References Cited

U.S. PATENT DOCUMENTS

| | | | |
|---|---|---|---|
| 5,333,874 A * | 8/1994 | Arnold | A63B 69/3658 473/409 |
| 6,322,455 B1 * | 11/2001 | Howey | A63B 24/0021 473/150 |
| 8,903,521 B2 | 12/2014 | Goree et al. | |
| 8,905,855 B2 | 12/2014 | Fitzpatrick et al. | |
| 9,039,527 B2 | 5/2015 | Bentley et al. | |
| 9,044,661 B2 * | 6/2015 | Leonard | A63B 69/3676 |
| 9,076,014 B2 | 7/2015 | Flasko et al. | |

(Continued)

FOREIGN PATENT DOCUMENTS

WO    WO-2012177078 A2    12/2012

OTHER PUBLICATIONS

"3BAYSCLOUD", [Online]. Retrieved from the Internet: <URL: https://3bayscloud.3bayslife.com/gsa/home.php>, (accessed on Jul. 11, 2022), 2 pgs.

(Continued)

*Primary Examiner* — Jeffrey S Vanderveen
(74) *Attorney, Agent, or Firm* — Edmond DeFrank

(57) ABSTRACT

A system for providing golf swing guidance to a user can include a sensor assembly positionable on a ground surface. The sensor assembly can communicate with a network device to determine a location of the sensor assembly positioned on the ground surface. The sensor assembly can receive, based on the location of the sensor assembly, data representing aim instructions and a required swing characteristic for a desired trajectory of a golf ball. The sensor assembly can monitor a practice swing of the user and can produce practice swing data based on the monitored practice swing. The sensor assembly can determine a practice swing characteristic from the practice swing data and can determine a probable stroke result based on the practice swing characteristic and the required swing characteristic. The sensor assembly can transmit the probable stroke result to the user device.

20 Claims, 6 Drawing Sheets

(56) References Cited

U.S. PATENT DOCUMENTS

| | | |
|---|---|---|
| 9,401,178 B2 | 7/2016 | Bentley et al. |
| 2016/0144251 A1 | 5/2016 | Denning et al. |
| 2017/0087436 A1 | 3/2017 | Peterson |
| 2022/0161121 A1* | 5/2022 | Syed .................. A63B 71/0669 |
| 2023/0036888 A1* | 2/2023 | Pennacchia ........ A63B 69/3658 |

OTHER PUBLICATIONS

"BioMech Putt", [Online]. Retrieved from the Internet: <URL: https://www.biomechgolf.com/putt-by-biomech-putting-sensor/?v=4096ee8eef7d>, (accessed on Jul. 11, 2022), 23 pgs.

"BioMech Putt Putting Sensor Review", [Online]. Retrieved from the Internet: <URL: https://pluggedingolf.com/biomech-putt-putting-sensor-review/>, (Oct. 21, 2021), 9 pgs.

"Blast Motion and Diamond Kinetics Enter into License Agreement", [Online]. Retrieved from the Internet: <URL: https://www.businesswire.com/news/home/20190115005278/en/Blast-Motion-Diamond-Kinetics-Enter-License-Agreement>, (Jan. 15, 2019), 3 pgs.

\* cited by examiner

SYSTEM FOR PROVIDING PUTTING SPEED AND DIRECTION

CLAIM OF PRIORITY

This patent application claims the benefit of priority, under 35 U.S.C. Section 119(e), to Jack W. Peterson, U.S. patent application Ser. No. 63/393,193, entitled "SYSTEM FOR PROVIDING PUTTING SPEED AND DIRECTION," filed on Jul. 28, 2022, which is hereby incorporated by reference herein in its entirety.

BACKGROUND

The present invention relates to golf, and more particularly to computer-assisted methods for providing guidance to a golfer.

Golf is played on golf courses that include various features, including tee boxes, fairways, the rough, water hazards, sand traps, and greens. The terrain of the golf course is generally varied to increase difficulty and improve play experience for golfers. Each green includes a hole marked by a flag into which the golfer attempts to place his or her golf ball. The object of the game is to move a golf ball from the tee box into the hole in as few shots or strokes as possible. This process is repeated over a number of holes in an attempt to obtain as low as possible number of shots or strokes.

The strokes or shots can be performed with various golf clubs depending on the conditions and distance to the hole. For example, a driver is commonly used on long shots taken from the tee box, an iron or wedge is commonly used on relatively shorter shots from the fairway or the tee box, and a putter is most frequently used on the green to make short shots or putts, typically on the green. Once the ball is on the green, various physical contours and properties of the green can be analyzed by the player to aid the player in accurately putting the ball into the hole. Factors such as distance to the hole, lines, slopes, grades, wind speed, wind direction, wetness or dryness of the grass, the length of the grass, the grain of the grass and other variables can be taken into account when determining the direction and swing speed of the golf club.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
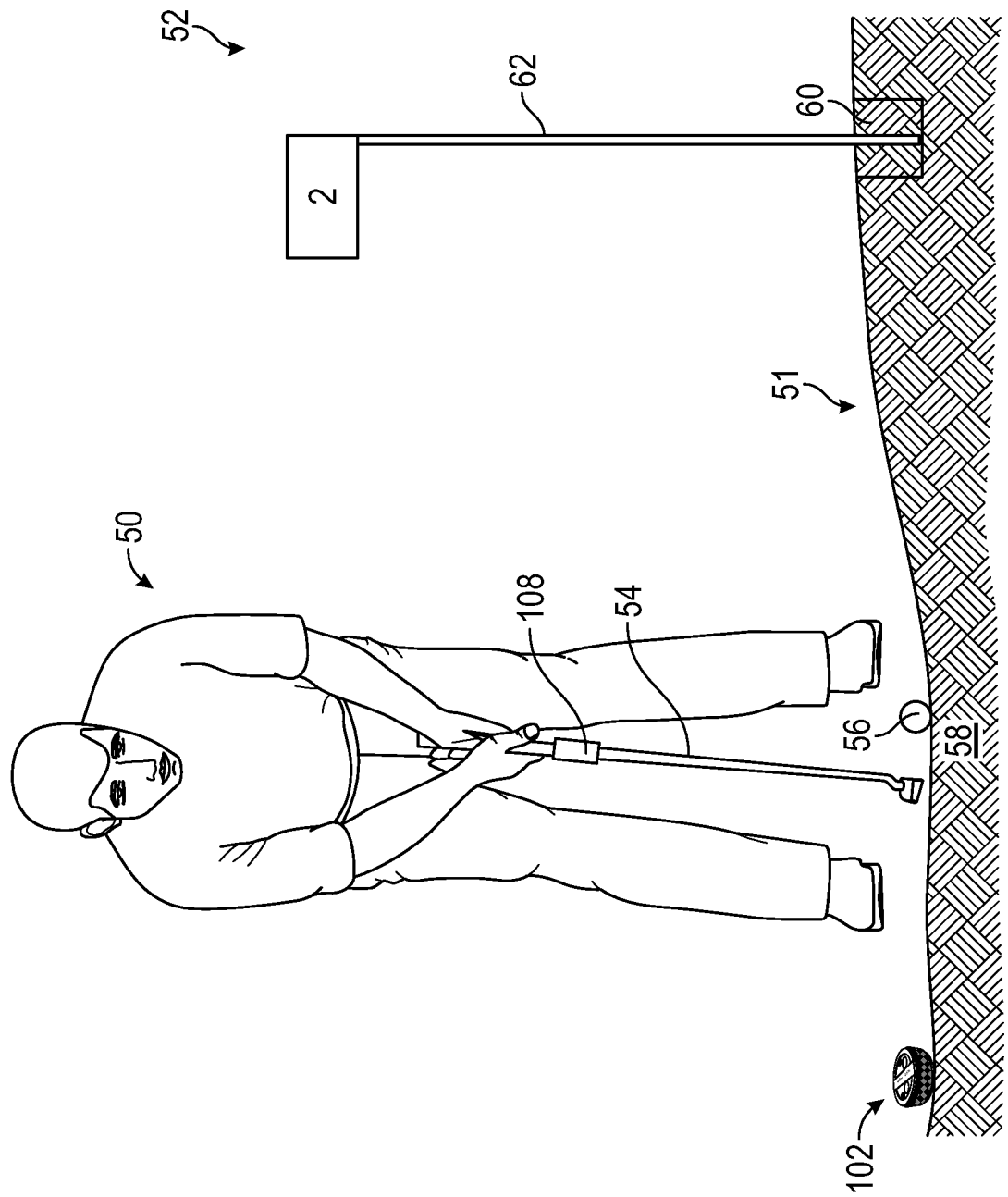
FIG. 1 illustrates an elevation view of a sensor system and a golfer on a putting green.

Some of the most important considerations when putting are a position of the ball on the green and the distance between the ball and the hole. A player's likelihood of success depends at least in part on the player knowing these pieces of information. Once the position and distance has been determined, the player can adjust his or her swing accordingly. The position of the ball and the distance between the ball and the hole is typically gauged by pacing or is otherwise estimated by the player. However, even when an accurate measurement is obtained, it can be difficult for the player to account for ground conditions and varying slopes of putting greens.

The present application helps to address these issues by providing a system that can provide to a user (or golfer) putting aim guidance, such as ball direction and velocity, based on a detected location of the golf ball. The system can determine topography and other information about the hole based on the ball location. The system can then provide a ball trajectory to put the ball in the hole to the user, which can be communicated in simple terms such as aim direction relative to the hole and putting distance relative to the hole. This information can help to guide the user to perform a putting stroke that will increase a likelihood that the user will make the stroke or putt.

While this guidance alone can be helpful, another important aspect of putting is to know what stroke is likely to produce the correct ball speed and direction (or velocity). The system can help to address this issue by monitoring a practice swing of the user and producing swing data based on the monitored swing, where the system can use the swing data to produce practice swing characteristics. The system can determine, based on the hole location, one or more required swing characteristics to put the ball on the selected path to make the putt or stroke. The system can then compare practice swing characteristics to required swing characteristics and can provide feedback or guidance to the user. For example, the system can inform the user whether or not the stroke is likely to result in a made putt.

Optionally, the system can provide swing adjustment suggestions and, optionally, multiple practice swings and suggestion cycles can be performed. When the user decides to make the putting stroke, the system can also monitor the putting stroke and compare characteristics of the putting stroke to the required characteristics or the practice swing characteristics. The system can receive information as to whether the putt was made and can modify future recommendations or otherwise update a model based on the collected information. The system can also provide additional guidance based on the result and the comparisons of stroke characteristics. The system can thereby help to guide or inform the user to make or nearly make a putt or stroke and can, in the process, help the user to learn putting trajectories or paths likely to result in a made putt, which can help the user learn a particular course or how to read greens, generally.

The above discussion is intended to provide an overview of subject matter of the present patent application. It is not intended to provide an exclusive or exhaustive explanation of the invention. The description below is included to provide further information about the present patent application.

FIG. 1 illustrates an elevation view of a sensor system 102 and a golfer 50 on a putting green 51 of a golf course 52. More specifically, the golfer 50 is illustrated holding a putter 54 and addressing a ball 56 on a putting surface 58 of the green 51. The golfer 50 is aligned toward a hole 60 indicated by a flag 62. The sensor system 102 can be placed or located on or near the putting surface 58, such as behind the ball 56 relative to the hole 60.

As discussed in further detail below, the sensor system 102 can include one or more sensors for observing a swing of the golfer 50, such as a practice swing or a stroke of the putter 54 as it contacts the ball 56. The sensor system 102 can produce swing data based on the observed or monitored swing, which can be used by a system (e.g., a system including the sensor system 102) to provide swing guidance to the user.

The sensor system 102 can also include one or more sensors to determine or transmit a location of the sensor system 102. As discussed in further detail below, the location of the sensor system 102 can be used to identify the course and hole of the course on which the sensor system 102 is placed. The system can determine, based on the hole location, one or more required swing characteristics to put the ball on the selected path to make the putt or stroke. The system can then compare practice swing characteristics of the putt, as observed by the sensor system 102, to required swing characteristics to make the putt and provide feedback or guidance to the golfer 50. For example, the system can inform the golfer 50 whether or not the stroke is likely to result in a made putt, helping to improve a user's score, help the user learn their golf course, and to help improve the user's green reading skills.

Figure 2:
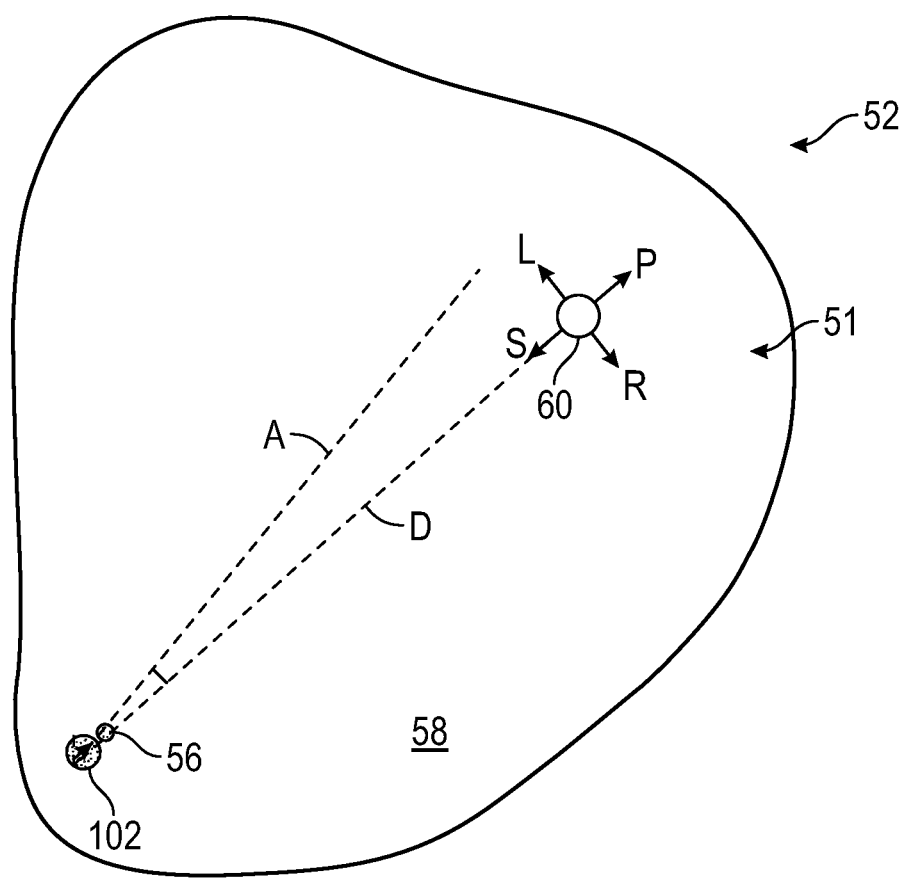
FIG. 2 illustrates a plan view of a putting green.
Figure 3:
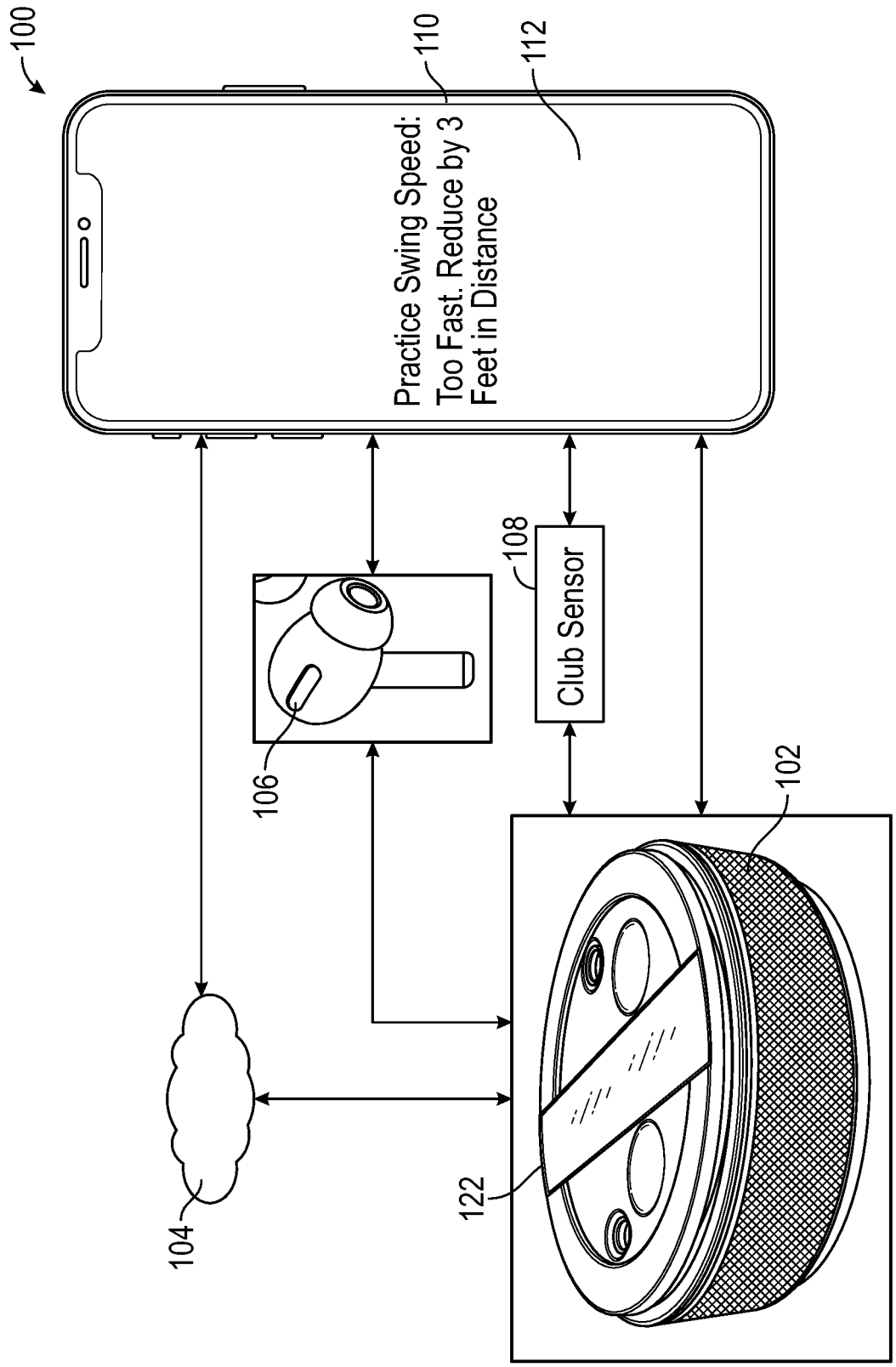
FIG. 3 illustrates a schematic view of a golf swing system.

FIG. 2 illustrates a plan view of the putting green 51 showing the surface 58 and including the hole 60. FIG. 3 illustrates a schematic view of a golf swing system 100. The golf swing system 100 can include the sensor system 102, a cloud-based system 104, a user audio device 106, a club sensor 108, and a user device 110.

The sensor system 102 can be a device including a variety of sensors, a processor, memory, transceiver, and other components, as discussed in further detail below. The sensor system 102 can include sensors for collection of location data and for monitoring or observing a swing of the golfer 50. For example, the sensor system 102 can include one or more of a radar sensor, a lidar sensor, an image capture device (e.g., camera), an optical sensor, or the like. The sensor system 102 can produce one or more signals based on observed or monitored swings of the golfer 50 that can be transmitted to the cloud-based system 104, the user device 110, or other devices.

The cloud-based system 104 can be, or can include, storage systems or storage networks that include multiple storage apparatus or devices and one or more processors. The cloud-based system 104 can be connected to one or more of the devices of the golf swing system 100, such as the sensor system 102 and the user device 110.

The user audio device 106 can be an audio device, such as headphones or earbuds configured to output audio via a speaker. Optionally, the user audio device 106 can include a microphone configured to receive audio input, such as from a user (e.g., golfer 50). The user audio device 106 can be connected to one or more devices of the golf swing system 100 such as the user device 110 and the sensor system 102.

The club sensor 108 can be one or more sensors connectable to a golf club of the golfer 50 such as the putter 54 of FIG. 1. The club sensor 108 can be connected to one or more portions of the golf club such as the grip, the head, or the shaft. FIG. 1 shows that the club sensor 108 can be connected to a shaft portion of the putter 54. The club sensor 108 can include sensors such as an accelerometer, a gyroscope, a pressure sensor, a force sensor, a light sensor, or the like. The club sensor 108 can be configured to collect swing data as the user operates the club (e.g., the putter 54) and transmit collected swing data, such as direction, position, angular momentum, or the like. The club sensor 108 can also include a transmitter or transceiver configured to transmit collected data to the sensor system 102, the cloud-based system 104, or the user device 110. The transceiver can use one or more wireless communication technologies, such as Bluetooth, Wi-Fi, NFC, cellular, or the like.

The user device 110 can be a tablet, smartphone, computer, laptop computer, or other device including a processor and a transceiver. As shown in FIG. 3, the user device 110 can be a smartphone including a display screen 112 for receiving user input and for providing output to the user. Similarly, the sensor system 102 can include a user interface 122, which can be a display screen or other device for receiving user input and for providing output to the user. Further details of the user interface 122 are discussed below with respect to FIG. 4.

Though only some connections are shown in FIG. 3, each of the components of the golf swing system 100 can be directly or indirectly connected to each of the other components of the golf swing system 100.

FIG. 2 shows directions Left, Right, Past, and Short. The sensor system 102 can include a transceiver (as discussed below) configured to connect to an external system, such as the cloud-based computing system 104 through one or more local or remote antennas. As discussed in U.S. application Ser. No. 15/256,452, which is incorporated by reference herein, the sensor system 102 and the cloud-based system can, together, use the global positioning system (GPS) along with a real time kinematics (RTK) system to determine a location of the sensor system 102 and therefore a location of the ball 56. The determined location can be used to identify the golf course 52 and the putting green 51 of the hole of the sensor system 102 and the golfer 50.

The system (e.g., the sensor system 102, the cloud-based system 104, or the user device 110) can include a database of golf courses and holes where a topography of each green is stored and maintained. The database can also store recent golf hole locations on each green, which can be input by previous users (e.g., golfers or workers). Optionally, if a location of the hole is shown incorrectly, the golfer 50 can place the sensor system 102 at the location of the hole to correct (such as using GPS and RTK) the location of the hole on the green. The hole location can then be updated in the database, such as in the cloud-based system 104. For example, the sensor system 102 can be used to determine the location of the hole 60 on the putting green 51.

Because the system (e.g., the sensor system 102 or the cloud-based system) knows the location of the hole 60 and the ball 56, the system 104 can determine a distance D between the ball 56 and the hole 60. Further, because the system knows a topography of the putting green 51, the system 104 can determine, using a physics engine, as discussed in U.S. application Ser. No. 15/256,452, incorporated above, a plurality of trajectories of the ball to be holed or made by a putt. The trajectories can be presented to the user for selection of a desired trajectory, i.e., a putt with a desired speed and path to the hole.

As mentioned above and as discussed in further detail below, the system 100 can determine, based on the hole location, one or more required swing characteristics to put the ball on the selected path. The selected path can be communicated to the golfer 50 such as via the user device 110 or the sensor system 102 and can be used by the sensor system 102, cloud-based system 104, or the user device 110 to determine putting stroke instructions. For example, though the distance between the ball 56 and the hole is D, the system 104 can provide instructions to make a stroke at a force to normally fall short of the hole, such as by a distance of one foot (or about 0.3 meters).

Similarly, the system 104 can provide directional aiming instructions relative to the hole 60. For example, though the shortest path to the hole is shown by the line indicating distance D, the system can show an aiming path A (e.g., graphically) such as on the user device 110 or the sensor system 102. The aiming path A can also be communicated to the user in relative directional instructions. For example, directions can be sent (e.g., via the user audio device 106) to aim left of the hole by 3.3 feet (or about 1 meter). The user can optionally use this information of an aim point and an aiming distance to make a stroke or to make a practice stroke.

If the user so decides, the user can select, such as via the user device 110, to have the sensor system 102 observe a practice swing or practice stroke. The sensor system 102 can observe, such as via one or more sensors, the practice swing of the golfer The sensor system 102 can produce data based on the observed or monitored practice swing. The data can be transmitted to the cloud-based system 104 or the user device 110 or can be stored at the sensor system 102. The data of the practice swing can be used to determine one or more practice swing characteristics, which any of the sensor system 102, the cloud-based system 104, or the user device 110 can compare to the one or more required swing characteristics to put the ball on the selected path.

Based on this comparison, the system (any of the sensor system 102, cloud-based system 104, or user device 110) can determine a probable stroke result or outcome of the putt and can transmit the probable stroke result to the user device 110, or can transmit such information through the sensor system 102 or the user audio device 106. For example, the system can inform the golfer 50 whether or not the stroke is likely to result in a made putt. This information (or feedback) can be provided to the user in various ways, such as through audio feedback (e.g., through the user audio device 106, the sensor system 102, or the user device 110). The feedback or information can also be provided to the golfer 50 via visible feedback such as a display of images on the display screen 112 or the user interface 122 or through one or more lights on the sensor system 102. The feedback or information can also be provided to the golfer 50 in other ways, such as vibration of the user device 110, such as when it is in the pocket of the golfer 50. For example, a first vibration characteristic (e.g., quick vibrations) can indicate a bad practice stroke and a second vibration characteristic (e.g., slow vibrations) can indicate a good practice stroke.

The golfer 50 can receive this information and modify their swing and can optionally repeat the practice swing process until the user receives a notification that the practice swing is likely to result in a holed putt. In this way, the golfer 50 can use feedback provided by the sensor system 102 (or the cloud-based system 104 or the user device 110) to select a putting trajectory or line and can further use the golf swing system 100 to determine whether a practice stroke of golfer 50 is likely to result in a ball trajectory on the selected line. These systems and methods can help to lower a golfer's score while helping a golfer learn green reading and putting distance control.

Optionally, the golfer 50 can select an indication on the user device 110 or sensor system 102 that the golfer 50 is going to deliver a stroke to the ball 56. The sensor system 102 can observe or monitor the delivered stroke and can produce stroke data which can be used to determine one or more stroke characteristics. The stroke characteristics can be compared to the required characteristics and the practice swing characteristics and feedback or guidance for use on future putts can be provided to the golfer 50. Further details of these systems and methods are discussed below with regard to FIGS. 5 and 6.

Figure 4:
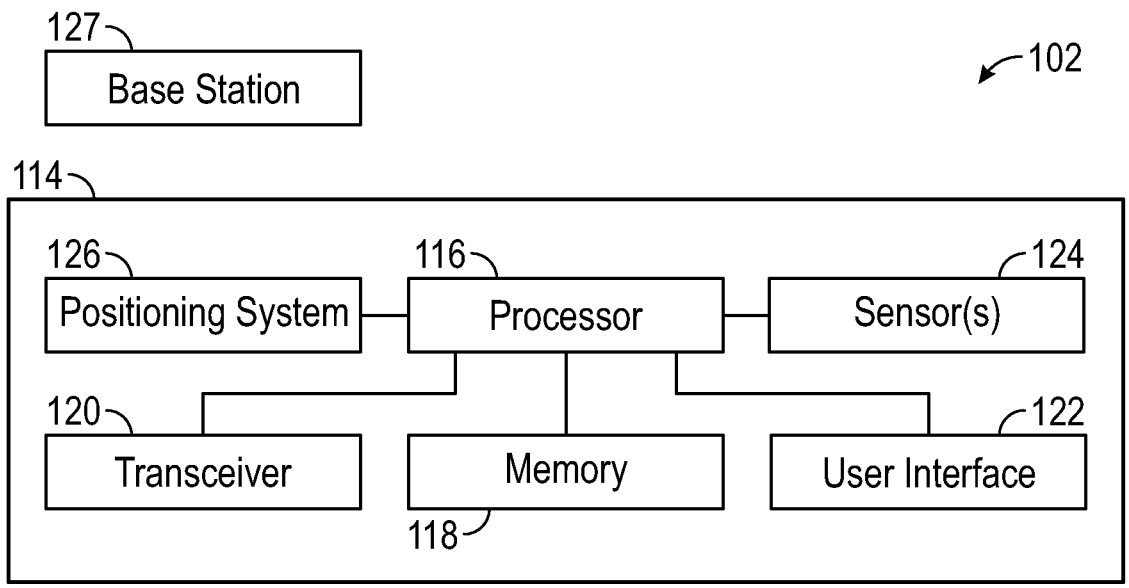
FIG. 4 illustrates a schematic view of a sensor assembly.

FIG. 4 illustrates a schematic view of a sensor assembly 102. The sensor system 102 can include a housing 114 configured to house and support the components of the sensor system 102. The sensor system 102 can include a processor 116, memory 118, one or more transceivers 120, one or more user interfaces 122, one or more sensors 124, and a positioning system 126.

The processor 116 can be any circuit or virtual circuit (e.g., a physical circuit emulated by logic executing on an actual processor) that manipulates data values according to control signals (e.g., "commands," "op codes," "machine code," etc.) and that can produce corresponding output signals that can be applied to operate a machine. A processor can be a one or more of a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or the like. A processor can further be a multi-core processor having two or more independent processors (sometimes referred to as "cores") that may execute instructions contemporaneously.

The memory 118 can be connected to the processor 116 and can be machine-readable medium, which can be a component, device, or other tangible medium able to store instructions and data temporarily or permanently and can include random-access memory (RAM), read-only memory (ROM), buffer memory, flash memory, optical media, magnetic media, cache memory, other types of storage (e.g., erasable programmable read-only memory (EPROM)), or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices.

The transceiver 120 can be any antenna or device configured to send or receive signals, such as using one or more communication protocols such as Bluetooth, cellular, NFC, ethernet, Wi-Fi, or the like. Further examples are discussed below with respect to FIG. 7. The transceiver 120 can be connected to the processor 116 such as to receive data therefrom and to transfer data thereto. The one or more transceivers 120 can be configured to transmit data to or receive data from external devices (through any protocol or medium discussed above or below) such as the cloud-based system 104, the user audio device 106, the club sensor 108, or the user device 110.

The user interface 122 can be any display and/or input device. For example, the user interface 122 can be a touch screen monitor or display, or any combination of buttons, lights, switches, speakers, or the like. The user interface 122 can be connected to the processor 116 and can be configured to display information for receipt by the golfer 50. Optionally, the processor 116 can be configured to receive information from the user, such as via selectable indications or buttons, which can be transmitted by the user interface 122 to the processor 116. The user interface 122 can optionally be connected to an outer portion of the housing 114 to allow user interaction with the user interface 122. The user interface 122 can optionally extend at least partially through the housing 114.

The one or more sensors 124 can be any sensors configured to collect location or swing information. For example, as noted above, the one or more sensors 124 can include one or more of a radar sensor, a lidar sensor, an image capture device (e.g., camera), an optical sensor, or the like. The one or more sensors 124 can produce one or more signals based on observed or monitored swings of the golfer 50 that can be transmitted to the cloud-based system 104, the user device 110, or other devices. The one or more sensors 124 can be connected to the processor 116 such as to transmit data collected from the one or more sensors 124. The one or more sensors 124 can optionally extend at least partially through the one or more sensors 124 such as to enable collection of swing data.

The positioning system 126 can include one or more positioning receivers (such as a GPS receiver, i.e., L-band radio receiver) and processor for communicating with satellites and resolving a position of the sensor system 102 based on the resolution or calculation. The positioning system 126 can optionally be or can include an RTK system including a receiver and processor for using a corrective stream to more accurately resolve or determine a location of the positioning system 126 and the sensor system 102.

The correcting stream can be received from one or more base stations 127. The base station 127 can be located at the golf course 52 or can be located within a radius of several golf courses. The positioning system 126 can receive a correcting stream from the 127 and can (optionally with the GPS determined location) resolve the location of the sensor system 102 more accurately. For example, the positioning system 126 including the RTK system can determine a location of the sensor system 102 to an accuracy of up to ±1 centimeter.

In operation of some examples, the user can power on the sensor system 102, such as using the user interface 122. Once powered on, the sensor system 102 can be positioned at or near the ball 56 on the putting green 51 of the golf course 52 or any golf course. The positioning system 126 can determine a location of the sensor system 102, which can be transmitted to the cloud-based system 104 or the user device 110 for comparing to a database or table of courses and holes for identifying the hole 60 and the golf course 52 on which the sensor system 102 is placed.

As discussed above, the location of the sensor system 102 can also be used by the sensor system 102, the cloud-based system 104, or the user device 110 to determine a relative position of the sensor system 102 and the ball 56 to the hole 60, such as by referring to a table of hole placements for the identified putting green 51 and the identified golf course 52. Once the ball and hole locations are determined, a green topography can be determined and a desired ball trajectory can be selected. Once selected, required swing characteristics can be determined, as discussed above, and the user can indicate, such as through the user interface 122 or the user device 110 that the user wants to perform a practice swing to be observed or monitored by the sensor system 102.

When the sensor system 102 receives an input or instruction from the golfer 50 that a practice swing is to be observed, the sensor system 102 can activate the one or more sensors 124 and the one or more sensors 124 can observe or monitor the practice swing of the user, such as via an image capture device or radar. The one or more sensors 124 can produce a signal including data from the observed practice swing, which can be transmitted to the processor 116. The processor 116 can determine one or more practice swing characteristics based on the received signals from the one or more sensors 124. The processor 116 can then compare the practice swing characteristics to the required characteristics to put the ball 56 on the selected trajectory. Optionally, the processor 116 can instruct the one or more transceivers 120 to transmit the sensor data and the calculations can be performed at the cloud-based system 104 or the user device 110.

The processor 116 (or other processor of the cloud-based system 104 or the user device 110) can determine whether the practice swing characteristics are likely put the ball 56 on the selected trajectory and the results of the determination can be transmitted to the user, such as via the transceiver one or more transceivers 120 to the user audio device 106. Optionally the results can be transmitted to the user through the user interface 122 or the user device 110. The devices of the sensor system 102 can be used to perform additional steps, as discussed below with respect to FIGS. 5 and 6.

Figure 5:
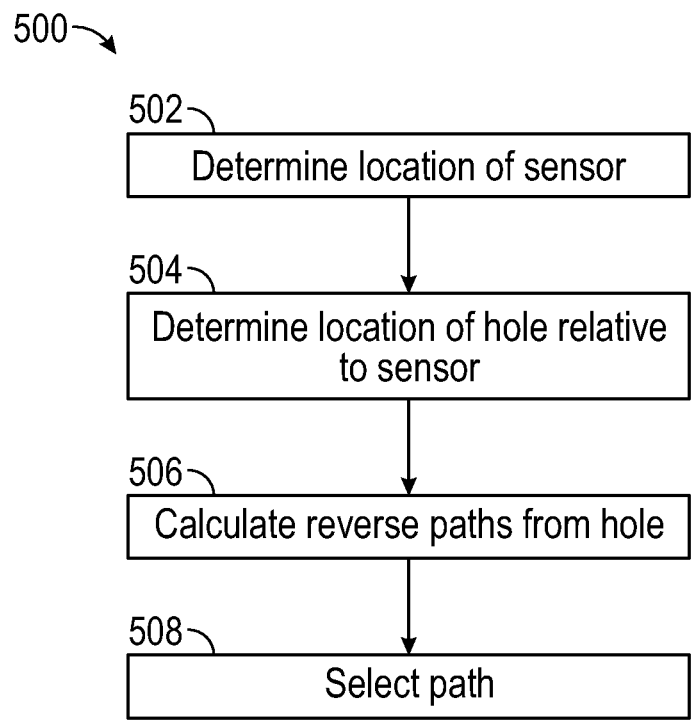
FIG. 5 illustrates a schematic view of a method.

FIG. 5 illustrates a schematic view of the method 500, in accordance with at least one example of this disclosure. The method 500 can be a method of providing golf swing information, guidance, or feedback to a user and can be performed using one or more of the devices discussed above or below. More specific examples of the method 500 are discussed below. The steps or operations of the method 500 are illustrated in a particular order for convenience and clarity; many of the discussed operations can be performed in a different sequence or in parallel without materially impacting other operations. The method 500 as discussed includes operations performed by multiple different actors, devices, and/or systems. It is understood that subsets of the operations discussed in the method 500 can be attributable to a single actor, device, or system could be considered a separate standalone process or method.

The method 500 can begin at a step 502 of communicating with a network device to determine a location of the sensor assembly positioned on the ground surface. For example, the sensor system 102 (e.g., the positioning system 126 of the sensor system 102) can communicate with a GPS network (and optionally an RTK network) to determine a location of the sensor system 102. The sensor system 102 can transmit the location to the cloud-based system 104 or the user device 110 where either device can use the location to identify the golf course (e.g., the golf course 52) and the putting green (e.g., the putting green 51) such as by referencing a table or database of stored locations of golf course and putting greens.

The golf swing system 100 (e.g., the cloud-based system 104) can also include a stored database or table of recent hole locations and can use the location of the sensor system 102 to determine a location of the nearest and most recent hole. Once the golf hole location is determined, the cloud-based system 104 or the user device 110 can transmit the location to the user, which can be displayed on the display screen 112 of the user device 110, the user interface 122 of the sensor system 102, or can be transmitted via another device, such as the user audio device 106. Upon receipt of the identifying information, the user can be presented with a confirmation indication, such as on the display screen 112 or the user interface 122, to confirm the location.

When, for example, the hole location is incorrect, the user can select an indication to update the hole location. The user (e.g., the golfer 50) can place the sensor system 102 at or near the hole 60 and can select an indication, such as on the display screen 112 of the sensor system 102 or the display screen 112 of the user device 110. The golf swing system 100 can then determine a location of the hole 60 (e.g., using the positioning system 126) and the golf swing system 100 can update the hole location database or table, such as at the cloud-based system 104.

At step 504, a location of the hole relative to the sensor can be determined. For example, once the hole location is confirmed or updated, the golf swing system 100 (e.g., the cloud-based system 104) can use the location of the hole 60 and the location of the ball 56 to determine a relative location of the sensor system 102 (located at the ball 56) to the hole 60.

Then, at step 506 the system can determine paths or trajectories, such as reverse paths, from the hole to the ball. Because the golf swing system 100 knows the identity of the putting green 51 of the golf course 52, the golf swing system 100 can look up or find a stored green topography for the putting green 51. The sensor system 102 (e.g., the cloud-based system 104) can then determine, such as using a physics engine, as discussed in U.S. application Ser. No. 15/256,452, one or more reverse paths or trajectories from the hole 60 to the ball 56.

At step 508, a path can be selected. For example, the system golf swing system 100 (e.g., through the user interface 122 or the display screen 112) can present to the golfer one or more paths or trajectories of which the golfer 50 can select a trajectory or path to the hole, such as based on required putting speed or velocity. Optionally, the golf swing system 100 can select an optimal path. The selected path can also be used by the sensor system 102, cloud-based system 104, or the user device 110 to determine putting stroke instructions. For example, the system 104 can determine or produce instructions to make a stroke at a particular distance and at a particular aiming point relative to the hole, as discussed above. The aim instructions can be used for additional steps, as discussed below with respect to FIG. 6.

Figure 6:
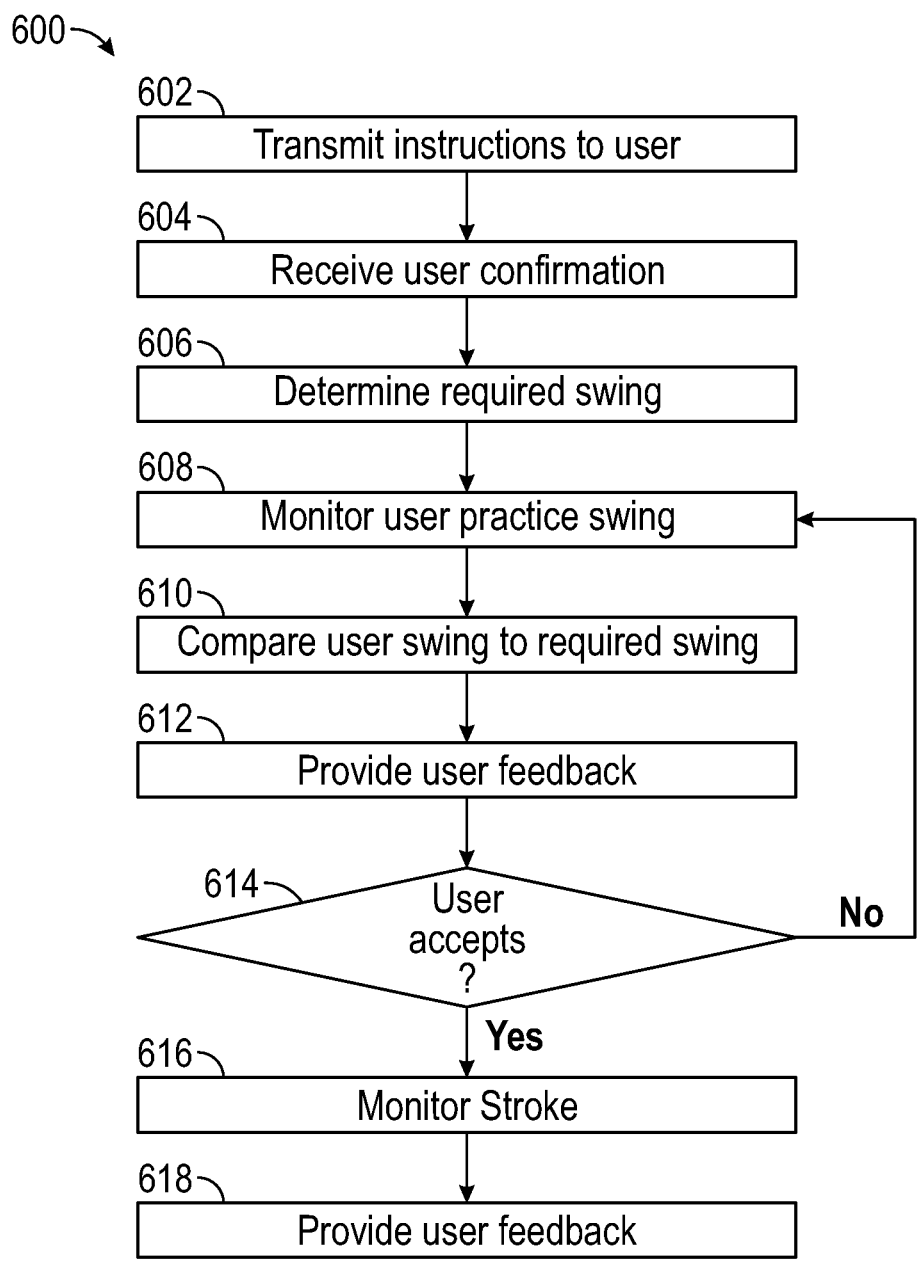
FIG. 6 illustrates a schematic view of a method.

FIG. 6 illustrates a schematic view of a method 600, which can be a method of providing golf swing information, guidance, or feedback to a user and can be performed using one or more of the devices discussed above or below. The method 600 can begin following any of the steps of the method 500 or can begin independently of the method 500.

At step 602, instructions can be transmitted to the user. For example, the sensor system 102 or the user device 110 can receive, for example from the cloud-based system 104, data representing aim instructions, such as based on the location of the sensor assembly, the hole location, and the selected path or trajectory. The aim instructions can include instructions to make a stroke at a force, at a distance, or at a distance relative to the hole. Similarly, the system 104 can provide directional aiming instructions relative to the hole 60. For example, the system can show or provide an aiming path (such as the path A discussed above) such as on the user device 110 or the sensor system 102, which can optionally include relative aiming instructions relative to the hole 60.

At step 604, the instructions can be confirmed by the user. For example, the user device 110 can display the aim and distance instructions for putting the ball 56 on the selected trajectory. The golfer 50 can review the instructions and can then confirm them, such as via a selectable indication on the display screen 112 (or optionally on the sensor system 102).

Following confirmation, at step 606 (but optionally before or during the step 604), the system can determine a required swing characteristic for the desired trajectory of a golf ball. For example, the cloud-based system 104, the user device 110, or the sensor system 102 can determine one or more swing characteristics to put the ball 56 on the selected trajectory, such as club head speed or velocity, club path direction, club face orientation (e.g., open, closed, open to the path, closed to the path), swing path contact position, club force, club momentum, or the like. At step 606, or in another step, the required swing characteristic(s) can be transmitted to the user device 110 or the sensor system 102 or optionally stored in the cloud-based system 104. The required swing characteristics can optionally be displayed to the user, such as via the display screen 112 or the user interface 122. The user can optionally confirm the swing characteristics and can optionally indicate to the golf swing system 100, such as via a selectable indication on the user device 110 or the sensor system 102, that the user (e.g., the golfer 50) desires to have the golf swing system 100 monitor or observe a practice swing.

At step 608, a practice swing of the user can be monitored. For example, upon receipt of an instruction (e.g., from the golfer 50), the one or more sensors 124 of the sensor system 102 can be enabled and the sensor system 102 can monitor a practice swing of the golfer 50. Optionally, the club sensor 108 can monitor a practice swing of the golfer 50. For example, the club sensor 108 can be configured to mention swing speed or acceleration of the club (e.g., the putter 54). Data collected from the club sensor 108 can be transmitted to the user device 110, the sensor system 102, or the cloud-based system 104 and can be used to determine one or more characteristics of the swing, such as swing tempo, which can be a speed, velocity, or acceleration of a backswing compared to a speed, velocity, or acceleration of a downswing or forward-swing.

The one or more sensors 124 can produce one or more sensor signals including data on the practice swing, which can be analyzed by the sensor system 102, the user device 110, or the cloud-based system 104. The golf swing system 100 can use the practice swing data to determine one or more practice swing characteristics from the practice swing data.

At step 610, the golf swing system 100 can compare the one or more practice swing characteristics to the required swing characteristics to determine a probable stroke result, such as whether the practice stroke was likely to result in putting the ball 56 on the selected trajectory and therefore into the hole 60. At step 612 feedback, guidance, or information regarding the probable stroke result from the observed practice swing can be transmitted to the user. For example, the determined probable stroke result can be communicated to the user, such as on the display screen 112 or the user interface 122 or can be communicated via the user audio device 106.

At step 614, acceptance or rejection of the probable stroke result can be received. For example, if the information transmitted to the user at step 612 indicates that the practice stroke was highly likely or somewhat likely to put the ball on the selected trajectory, the user can accept an indication to accept the result. If the information transmitted to the user at step 612 indicates that the practice stroke was highly unlikely to put the ball on the selected trajectory, the user can select an indication to reject the result and optionally have the golf swing system 100 monitor another practice swing. In such a case, steps 608, 610, and 612 can be repeated until the user accepts the result or feedback.

Also, at step 612, or during or prior to step 608 when it is determined by the golf swing system 100 that the probable stroke result would not put the ball on the selected trajectory, the golf swing system 100 can determine a golf swing adjustment based on the practice swing characteristic and the required swing characteristic and can transmit the golf swing adjustment to the user, such as through the sensor system 102 or the user device 110. For example, the adjustment can be to swing harder or softer and by how much. For example, as shown in FIG. 3, the display screen 112 can display a practice swing speed adjustment to reduce the swing speed by 3 feet (0.9 m) in distance. Or, the adjustment can be to make an alignment adjustment, such as aim further left or right of the hole.

At step 616, a stroke of the user can be monitored or observed. For example, upon receipt of an instruction (e.g., from the golfer 50), the one or more sensors 124 of the sensor system 102 can be enabled and the sensor system 102 can monitor a stroke of the golfer 50 on the ball 56. Optionally, the club sensor 108 can monitor a stroke of the golfer 50. The one or more sensors 124 can produce one or more sensor signals including data on the stroke, which can be analyzed by the sensor system 102, the user device 110, or the cloud-based system 104. The golf swing system 100 can use the stroke data to determine one or more stroke characteristics from the stroke data.

At step 618, the system can provide user feedback or guidance based on one or more of the stroke data (or characteristic) the required swing characteristics, or the practice swing data or characteristic. The golf swing system 100 can also receive information (such as from the golfer 50) as to whether the putt was made or whether the trajectory was accurate, such as through one or more user-selectable indications presented on the display screen 112 or the user interface 122. Based on any of this information, the golf swing system 100 can transmit guidance or feedback to the golfer 50, such as for future swings or strokes on the putting green 51 or another hole or green.

In this way, the golf swing system 100 can help to guide or inform the user to make or nearly make a putt or stroke and can, in the process, help the user to learn putting trajectories or paths likely to result in a made putt, which can help the user learn a particular course or how to read greens, generally. The golf swing system 100 can also help the user learn how to make a swing or stroke likely to put the ball on a desired trajectory.

Figure 7:
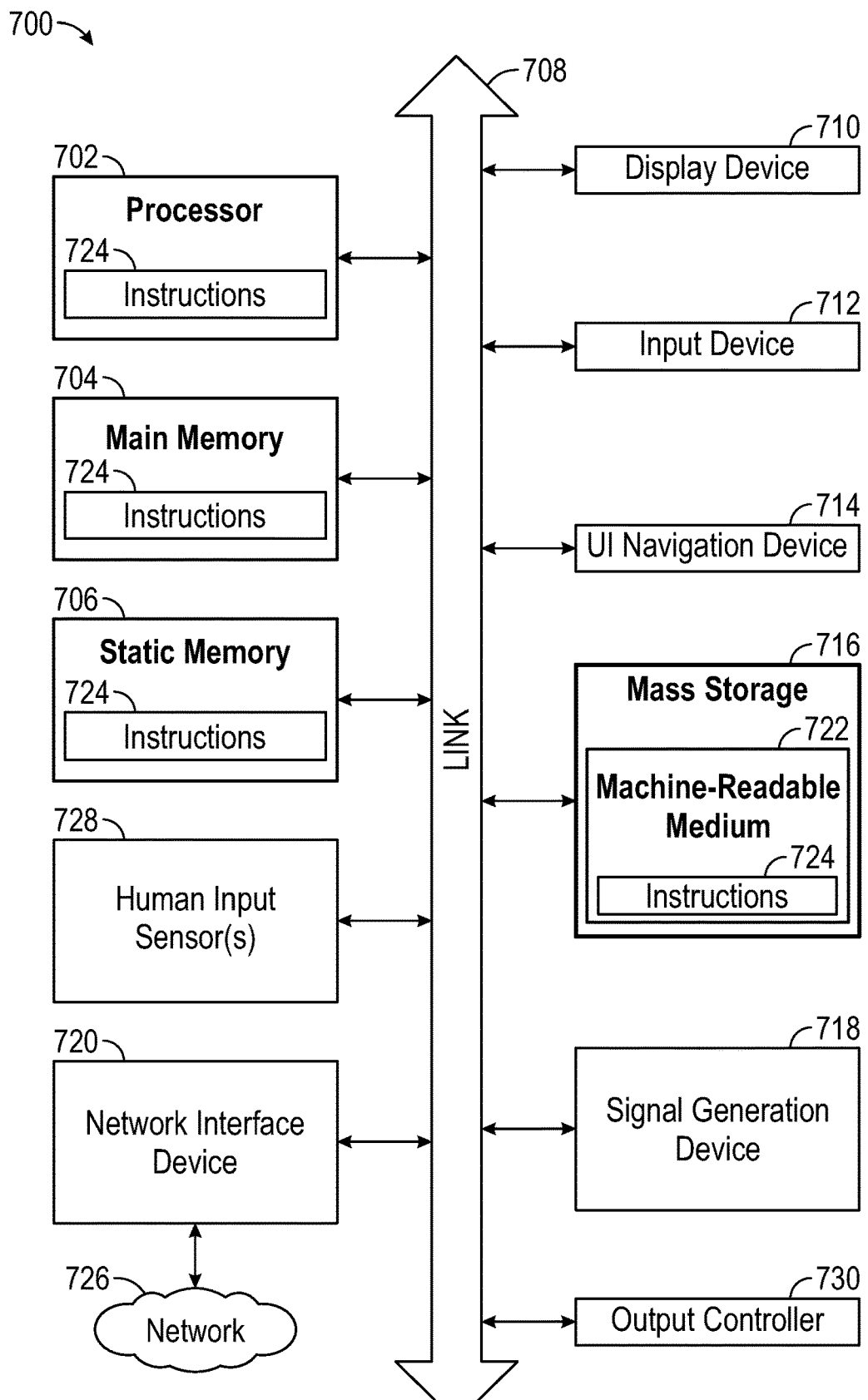
FIG. 7 illustrates a block diagram of a machine.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700 where the machine 700 can be one or more of the devices or systems discussed above, such as the golf swing system 100, the sensor system 102, the cloud-based system 104, or the user device 110.

Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Notes And Examples

The following, non-limiting examples, detail certain aspects of the present subject matter to solve the challenges and provide the benefits discussed herein, among others.

Example 1 is a system for providing golf swing guidance to a user, the system comprising: a sensor assembly positionable on a ground surface and configured to: communicate with a network device to determine a location of the sensor assembly positioned on the ground surface; receive, based on the location of the sensor assembly, data representing aim instructions and a required swing characteristic for a desired trajectory of a golf ball; transmit, to a user device, the golf ball aim instructions and the required swing characteristic based on the received data; monitor a practice swing of the user; produce practice swing data based on the monitored practice swing; determine a practice swing characteristic from the practice swing data; determine a probable stroke result based on the practice swing characteristic and the required swing characteristic; and transmit the probable stroke result to the user device.

In Example 2, the subject matter of Example 1 optionally includes the sensor assembly further configured to: determine a golf swing adjustment based on the practice swing characteristic and the required swing characteristic; and transmit the golf swing adjustment to the user device.

In Example 3, the subject matter of Example 2 optionally includes the sensor assembly further configured to: determine a stroke characteristic from a user stroke; and transmit the stroke characteristic to the user device.

In Example 4, the subject matter of Example 3 optionally includes a computing system configured to: receive the location of the sensor assembly positioned on the ground surface; identify a golf course and hole number based on the location of the sensor assembly; and select a green topography based on the identified hole number and the identified golf course.

In Example 5, the subject matter of Example 4 optionally includes the computing system further configured to: determine a hole location on or near a green based on the hole number and the identified golf course; and determine a relative location of the sensor assembly to the hole on or near the green.

In Example 6, the subject matter of Example 5 optionally includes the computing system further configured to: calculate a plurality of paths to the hole location on the green based on the sensor location, the hole location, and the green topography using a topography physics engine; and select one of the plurality of paths to the hole based on the location of the sensor assembly.

In Example 7, the subject matter of Example 6 optionally includes the computing system further configured to: transmit the selected path to the user device or the sensor assembly; and receive a user confirmation of the selected path.

In Example 8, the subject matter of Example 7 optionally includes the computing system further configured to: determine the required swing characteristic to achieve the desired ball trajectory on the selected path; and transmit the required swing characteristic to the user device.

In Example 9, the subject matter of any one or more of Examples 4-8 optionally include wherein the computing system is a cloud-based computing system.

In Example 10, the subject matter of any one or more of Examples 1-9 optionally include wherein the location of the sensor assembly positioned on the ground surface is determined using real time kinematic positioning.

In Example 11, the subject matter of any one or more of Examples 1-10 optionally include wherein the sensor assembly includes one or more of an image capture sensor, a radar sensor, and a lidar sensor.

In Example 12, the subject matter of any one or more of Examples 1-11 optionally include wherein the sensor assembly includes a wireless transceiver configured to connect the sensor assembly to the user device.

In Example 13, the subject matter of any one or more of Examples 1-12 optionally include wherein the sensor assembly further comprises: a location sensor positionable on the ground surface; and a club sensor configured to receive the swing data and configured to transmit the practice swing data to the location sensor or the user device.

Example 14 is a method of providing golf swing guidance, the method comprising: communicating with a network device to determine a location of a sensor assembly positioned on a ground surface; receiving, based on the location of the sensor assembly, data representing aim instructions and a required swing characteristic for a desired trajectory of a golf ball; transmitting, to a user device, the golf ball aim instructions and the required swing characteristic based on the received data; monitoring a practice swing of the user; producing practice swing data based on the monitored practice swing; determining a practice swing characteristic from the practice swing data; determining a probable stroke result based on the practice swing characteristic and the required swing characteristic; and transmitting the probable stroke result to the user device.

In Example 15, the subject matter of Example 14 optionally includes determining a stroke characteristic from a user stroke; and transmitting the stroke characteristic to the user device.

In Example 16, the subject matter of Example 15 optionally includes receiving the location of the sensor assembly positioned on the ground surface; identifying a golf course and hole number based on the location of the sensor assembly; and select a green topography based on the identified hole number and the identified golf course.

In Example 17, the subject matter of Example 16 optionally includes determining a hole location on or near a green based on the hole number and the identified golf course; and determining a relative location of the sensor assembly to the hole on or near the green.

In Example 18, the subject matter of Example 17 optionally includes calculating a plurality of paths to the hole location on the green based on the sensor location, the hole location, and the green topography using a topography physics engine; and selecting one of the plurality of paths to the hole based on the location of the sensor assembly.

In Example 19, the subject matter of Example 18 optionally includes transmitting the selected path from a computing system to the user device or the sensor assembly; and receiving a user confirmation of the selected path from the user device.

In Example 20, the subject matter of Example 19 optionally includes determining the required swing characteristic to achieve the desired ball trajectory on the selected path; and transmitting the required swing characteristic from the computing system to the user device.

Example 21 is a non-transitory machine-readable medium including instructions, for provide golf swing guidance to a user, which when executed by a machine, cause the machine to: communicate with a network device to determine a location of a sensor assembly positioned on a ground surface; receive, based on the location of the sensor assembly, data representing aim instructions and a required swing characteristic for a desired trajectory of a golf ball; transmit, to a user device, the golf ball aim instructions and the required swing characteristic based on the received data; monitor a practice swing of the user; produce practice swing data based on the monitored practice swing; determine a practice swing characteristic from the practice swing data; determine a probable stroke result based on the practice swing characteristic and the required swing characteristic; and transmit the probable stroke result to the user device.

In Example 22, the subject matter of Example 21 optionally includes the instructions to further cause the machine to: determine a golf swing adjustment based on the practice swing characteristic and the required swing characteristic; and transmit the golf swing adjustment to the user device.

In Example 23, the subject matter of Example 22 optionally includes the instructions to further cause the machine to: determine a stroke characteristic from a user stroke; and transmit the stroke characteristic to the user device.

In Example 24, the subject matter of Example 23 optionally includes the instructions to further cause the machine to: receive the location of the sensor assembly positioned on the ground surface; identify a golf course and hole number based on the location of the sensor assembly; and select a green topography based on the identified hole number and the identified golf course.

In Example 25, the subject matter of Example 24 optionally includes the instructions to further cause the machine to: determine a hole location on or near a green based on the hole number and the identified golf course; and determine a relative location of the sensor assembly to the hole on or near the green.

In Example 26, the subject matter of Example 25 optionally includes the instructions to further cause the machine to: calculate a plurality of paths to the hole location on the green based on the sensor location, the hole location, and the green topography using a topography physics engine; and select one of the plurality of paths to the hole based on the location of the sensor assembly.

In Example 27, the subject matter of Example 26 optionally includes the instructions to further cause the machine to: transmit the selected path to the user device or the sensor assembly; and receive a user confirmation of the selected path.

In Example 28, the subject matter of Example 27 optionally includes the instructions to further cause the machine to: determine the required swing characteristic to achieve the desired ball trajectory on the selected path; and transmit the required swing characteristic to the user device.

In Example 29, the apparatuses or method of any one or any combination of Examples 1-28 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for providing putting stroke guidance to a user on a golf course putting green, the system comprising:
   a remote server having a processor and a database, wherein the database is configured to collect, store and maintain high resolution LIDAR topography of at least one golf course with putting greens and holes associated with each putting green, wherein the high resolution LIDAR topography has centimeter accuracy coordinates;
   a club sensor having multiple sensors and a transmitter coupled to a golf putter and the remote server and configured to collect practice putting stroke data from the golf putter as golf putter physically moves;
   a sensor assembly having a real time kinematics device, wherein the sensor assembly is positionable on a ground surface of at least one of the putting greens and configured to use the real time kinematics device to identify a first location of at least one hole of at least one putting green and identify a second location of a golf ball on the at least one putting green within under ten centimeters, to transmit the first location and the second location to the remote server and to receive from the processor a comparison of the first and second locations to corresponding data of the high resolution LIDAR topography of the putting greens and holes; and
   wherein the processor of the remote server is further configured to compare a projected trajectory of the practice putter stroke data with a recommended trajectory of the practice putting stroke data and send feedback to a mobile device with aim, direction and speed guidance instructions about the projected trajectory of the practice putter stroke data based on the recommended trajectory of the practice putting stroke data.

2. The system of claim 1, the sensor assembly further configured to:
   generate golf swing adjustments based on the practice swing characteristic and the required swing characteristic; and
   transmit the golf swing adjustments to a user audio device.

3. The system of claim 2, the sensor assembly further configured to:
   generate a stroke characteristic from club sensor data of a user putter stroke; and
   transmit to the mobile device audio and vibration feedback.

4. The system of claim 3, further comprising:
   a computing system configured to:
   receive the location of the sensor assembly positioned on the ground surface;
   identify a golf course and hole number based on the location of the sensor assembly global positioning system sensor data; and
   select a green topography based on the identified hole number and the identified golf course.

5. The system of claim 4, the computing system further configured to:
   determine a hole location on or near a green based on the hole number and the identified golf course; and
   determine a relative location of the sensor assembly to the hole on or near the green.

6. The system of claim 5, the computing system further configured to:
   calculate a plurality of paths to the hole location on the green based on the sensor location, the hole location, and the green topography using a topography physics engine; and
   select one of the plurality of paths to the hole based on the location of the sensor assembly.

7. The system of claim 6, the computing system further configured to:
   transmit the recommended trajectory of the practice putting stroke to mobile device with a user audio device; and
   receive a user confirmation of the selected path.

8. The system of claim 7, the computing system further configured to:
   calculate the required swing characteristic to achieve the desired ball trajectory on the selected path; and
   transmit the required swing characteristic to the an audio user device.

9. The system of claim 4, wherein the computing system is a cloud-based computing system.

10. The system of claim 1, wherein the location of the sensor assembly positioned on the ground surface is determined using real time kinematic positioning.

11. The system of claim 1, wherein the sensor assembly includes one or more of an image capture sensor, a radar sensor, and a lidar sensor.

12. The system of claim 1, wherein the sensor assembly includes a wireless transceiver configured to connect the sensor assembly to the mobile device.

13. The system of claim 1, wherein the sensor assembly further comprises:
a location sensor positionable on the ground surface; and
a club sensor configured to receive the swing data and configured to transmit the practice swing data to the location sensor and an audio device.

14. A non-transitory machine-readable medium including instructions, to provide golf swing guidance to a user, which when executed by a machine, cause the machine to:
collect, store and maintain high resolution LIDAR topography of at least one golf course with putting greens and holes associated with each putting green, wherein the high resolution LIDAR topography has centimeter accuracy coordinates on a remote server having a processor and a database, wherein the database is configured to collect, store and maintain the high resolution LIDAR topography;
collect practice putting stroke data from the golf putter as golf putter physically moves on a club sensor having multiple sensors and a transmitter coupled to a golf putter and the remote server;
use a sensor assembly having a real time kinematics device, wherein the sensor assembly is positionable on a ground surface of at least one of the putting greens and configured to use the real time kinematics device to identify a first location of at least one hole of at least one putting green and identify a second location of a golf ball on the at least one putting green within under ten centimeters, to transmit the first location and the second location to the remote server and to receive from the processor a comparison of the first and second locations to corresponding data of the high resolution LIDAR topography of the putting greens and holes; and
wherein the processor of the remote server is further configured to compare a projected trajectory of the practice putter stroke data with a recommended trajectory of the practice putting stroke data and send audio feedback to a mobile application operating on a mobile device with aim, direction and speed guidance instructions about the projected trajectory of the practice putter stroke data based on the recommended trajectory of the practice putting stroke data.

15. The non-transitory machine-readable medium of claim 14, the instructions to further cause the machine to:
determine a golf swing adjustment based on the comparison of the practice putting stroke and a required swing characteristic; and
transmit the golf swing adjustment to the mobile application of a user of the mobile device.

16. The non-transitory machine-readable medium of claim 15, the instructions to further cause the machine to:
determine a stroke characteristic from a user stroke; and
transmit the stroke characteristic to the user device.

17. The non-transitory machine-readable medium of claim 16, the instructions to further cause the machine to:
receive the location of the sensor assembly positioned on the ground surface;
identify a golf course and hole number based on global positioning system sensor data location of the sensor assembly; and
select a green topography based on the identified hole number and the identified golf course from stored high resolution LIDAR topography of golf courses and holes of putting greens of the database.

18. The non-transitory machine-readable medium of claim 17, the instructions to further cause the machine to:
determine a hole location on or near a green based on the hole number and the identified golf course; and
determine a relative location of the sensor assembly to the hole on or near the green.

19. The non-transitory machine-readable medium of claim 18, the instructions to further cause the machine to:
calculate a plurality of paths to the hole location on the green based on the sensor assembly first and second locations of, the hole location, and the green topography using a topography physics engine; and
select one of the plurality of paths to the hole based on the golf ball location of the sensor assembly.

20. The non-transitory machine-readable medium of claim 19, the instructions to further cause the machine to:
transmit the selected path to a user audio device or the sensor assembly;
receive a user confirmation of the selected path;
determine the required swing characteristic to achieve the desired ball trajectory on the selected path; and
transmit the required swing characteristic to the mobile application of a user of the mobile device.

* * * * *